United States Patent [19]

White

[11] 4,314,248
[45] Feb. 2, 1982

[54] DECEPTIVE REPEATER FOR PASSIVE LOBING COUNTERMEASURES

[75] Inventor: Jerome V. White, Amherst, N.H.

[73] Assignee: The United States of America as represented by the Secretary of the Navy, Washington, D.C.

[21] Appl. No.: 862,631

[22] Filed: Sep. 17, 1969

[51] Int. Cl.³ .............................................. G01S 7/38
[52] U.S. Cl. .................................................. 343/18 E
[58] Field of Search ..................................... 343/18 E

[56] References Cited

U.S. PATENT DOCUMENTS

| 3,792,475 | 2/1974 | Smetana | 343/18 E X |
| 3,896,439 | 7/1975 | Lester et al. | 343/18 E |
| 4,126,862 | 11/1978 | Simonaire | 343/18 E |

Primary Examiner—T. H. Tubbesing

[57] ABSTRACT

An oscillator control circuit for controlling the "on" time of a repeater countermeasure radar having a plurality of oscillators, each generating a portion of a lobing frequency band covering an unknown lobing frequency expected from an enemy radar, the outputs from which are conducted through an AND circuit. The AND circuit can be mechanized to produce the required switching function whenever the several portions of oscillators all are either greater or less than a predetermined value to produce an output signal to switch the repeater countermeasure "on" for enemy radar deception, the sweep time of the plurality of oscillators over their respective partial bands being adjustable.

8 Claims, 4 Drawing Figures ns are used to produce a complex wave and the jammer repeater is turned "on" for those
DECEPTIVE REPEATER FOR PASSIVE LOBING COUNTERMEASURES

BACKGROUND OF THE INVENTION

The linear sweep of a frequency over a range of frequencies to encounter an unknown signal lobing frequency expected from an enemy passive sequential lobing radar to detect and repeat back the radar frequency at the pulse repetition rate to deceive is well known in the radar countermeasures art. Silent sequential lobing radars do not reveal their lobing rate in their transmission, and therefore the countermeasure equipment must sweep through the entire possible range of lobing rates. If the frequency of the countermeasure modulation is swept slowly enough to cause break lock when the correct frequency is reached, the length of time spent at the wrong frequency may be excessive.

SUMMARY OF THE INVENTION

In the present invention the enemy radar range lobing frequency in an expected frequency band is divided into a plurality of band portions, reasonably four, and four oscillators are used to generate four frequencies, each controlled to sweep a portion of the total frequency band of lobing frequencies. These four oscillators are made to generate these four frequency band portions simultaneously and their outputs are mixed in an AND circuit. In this manner the total enemy lobing frequency band is swept in the time that it takes any one oscillator to sweep its band portion and this time of completing the sweep is made adjustable from one to several seconds. Whenever the mixed frequencies fall above or below the average value of the complex wave formed thereby, a signal output switches "on" a repeater radar to jam the enemy radar. In this manner no in-phase energy is radiated with that of the enemy radar to prevent break-lock of the jammer. The jammer radar would be turned "on" only during those times when all of the individual waveforms were below their average values to ensure that when the frequency and phase of the swept signal was correct for inverse-scan deception, no in-phase components would prevent break-lock.

It is generally recognized that a linear sweep jammer radar would transmit 50% of the time when the wave falls below its average value. Where three oscillators are used and their outputs mixed to produce a complex wave and the jammer repeater is turned "on" for those times that the waves are negative, the jammer would be "on" only 12% of the time. For four oscillators the jammer would be "on" only 6.1% of the time but this time "on" would be sufficient for most enemy gates; however, four oscillators may be too many for some applications and the use of three oscillators or less may be more expedient. It may be seen from the above that a gain of four in time savings result in a loss of eight in power demonstrating that the "on" time obeys a power loss of $2^{(n)}$ when n is the number of oscillators used. Accordingly, for the purpose of description herein two units of four oscillators are illustrated with selective switching to permit selected band portions with frequency separation on contiguous frequencies, as desired, but with no more than four partial frequency bands. Accordingly, it is a general object of this invention to provide an oscillator control circuit of one to four oscillators to cover selected bands of enemy range radar to produce a complex wave that is operative through AND circuitry to activate a repeater or jammer radar with a signal with no components acting to prevent break-lock of the enemy radar to deceive the latter in angle measurement.

BRIEF DESCRIPTION OF THE DRAWINGS

These and other objects and the attendant advantages, features, and uses will become more apparent to those skilled in the art as a more detailed description proceeds when considered in conjunction with the accompanying drawings in which.

DESCRIPTION OF THE PREFERRED EMBODIMENT

Figure 1:
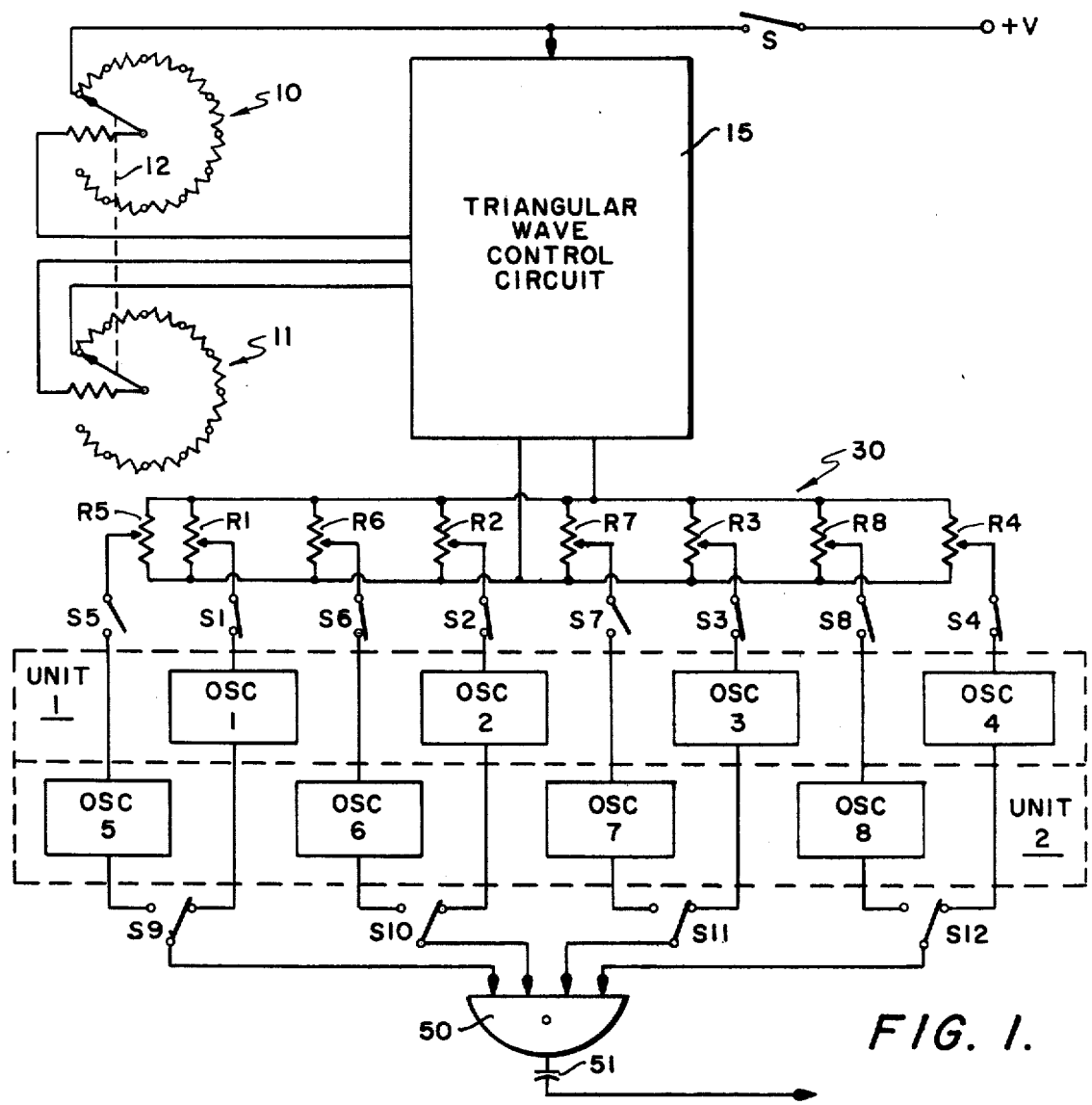
FIG. 1 is a block circuit diagram of the invention.
Figure 2:
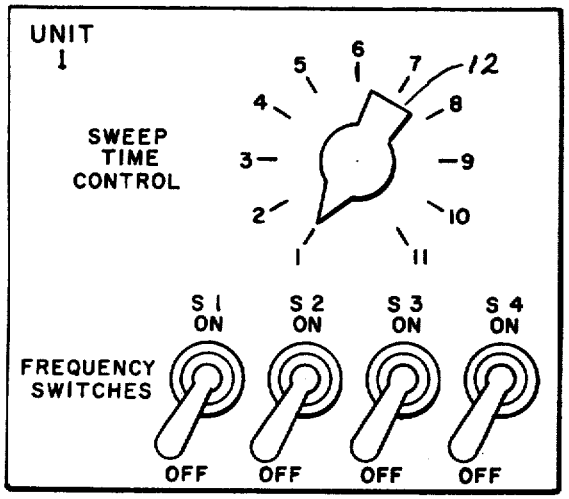
FIG. 2 is a face view of the panel of unit #1 in FIG. 1.
Figure 3:
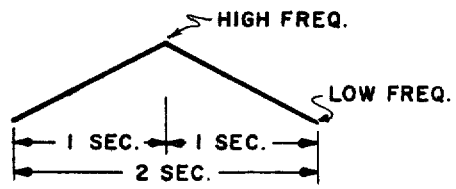
FIG. 3 is a curve illustrating the frequency sweep of the oscillators in FIG. 1.

Referring more particularly to FIG. 1 with occasional reference to FIGS. 2 and 3 there is illustrated a block circuit diagram of the invention in which a voltage supply is applied through a master switch S to time sweep control elements 10 and 11 and a triangular wave control circuit 15. This circuit controls the current to establish the voltage across a potentiometer component 30 which supplies a voltage through the potentiometers R1 through R8 and switches S1 through S8 to oscillators #1 through #4 in unit 1 and oscillators #5 through #8 in unit 2. The voltage across the potentiometer component 30 is adjustable in sweep time by the adjustable means 10 and 11 mechanically coupled by the means 12 indicated as the knob 12 on the panel unit 1 shown in FIG. 2. The elements 10 and 11 in FIG. 1 and the knob control 12 in FIG. 2 are shown for the purpose of illustration as being on the first contact #1 providing a one second sweep, as more clearly shown in FIG. 3 to cause a voltage sweep from the low frequency position to the high frequency position in one second by the oscillators. The element 10 controls the sweep from the low frequency to the high frequency in one second while the element 11 controls this return sweep from high frequency to low frequency in one second, as shown in FIG. 3, giving a total sweep time of two seconds all of which will be more clearly and fully described in the description of FIG. 4. Switches S1 through S4 are also shown on the panel of FIG. 2 being the switches to switch in oscillators #1 through #4 in unit 1, these switches being shown closed in FIG. 1 but shown "off" in FIG. 2. Accordingly, selected switches S1 through S8 can be closed to energize the desired oscillators #1 through #8. The outputs of the oscillators #1 and #5 are coupled through an alternately seated selector switch S9, the outputs of oscillators #2 and #6 are coupled through the selector switch S10, the oscillator outputs of #3 and #7 are coupled through the selector switch S11, and the oscillator outputs of #4 and #8 are coupled through the selector switch S12, all coupled as inputs to an AND circuit 50. The output of the AND circuit 50 is through a coupling capacitor 51 to a source of use such as an "on-off" control at a repeater countermeasures radar. The oscillators #1 through #4 provide a sweep frequency through a band of frequencies expected to be used by an enemy angle tracking radar, each oscillator #1 through #4 providing a partial band sweep in accordance with the voltage sweep applied by the triangular wave control circuits 10 through 15. The oscillators #5 through #8 in unit 2 may provide a band of expected frequencies used by an enemy radar higher than the bandwidth of unit 1. For example, the bandwidth of the unit 1 may be 84 cycles to 147 cycles while the bandwidth of unit 2 may cover a frequency of 147 cycles to 231 cycles providing a 13 to 22 cycle partial bandwidth for each oscillator. The center frequency of each oscillator may be controlled by the potentiometers R1 through R8 in the potentiometer component 30. Whenever the selected oscillators, usually four or less, are energized and switched to the AND circuit 50 to provide a mixed complex wave which extends below the average value of the complex wave, an output signal will be produced through the output coupling capacitor 51 for the repeater radar to be activated. It may be determined from actual practice or the visual observation of the frequency waveforms of the oscillators that the average "on" time for just one oscillator would be, as expected, 50% since 50% of the oscillator waveform would be below the average value. If the number of oscillators used are increased, this "on" time drops in accordance with a $2^{(n-1)}$ law in which each gain in time by the frequency coverage of the oscillators produces a loss in power in accordance with this law. For example, where three oscillators are channeled to the AND circuit 50, the "on" time for the repeater countermeasures radar would be only 12% while the use of four oscillators in the channel to the AND circuit 50, the "on" time would amount only to 6.1%. Accordingly, the number and selection of oscillators can be made by the selector switches S1 through S12 to meet the needs of the countermeasures circuit for the anticipated type of an aircraft or radar surveillance encountered.

Figure 4:
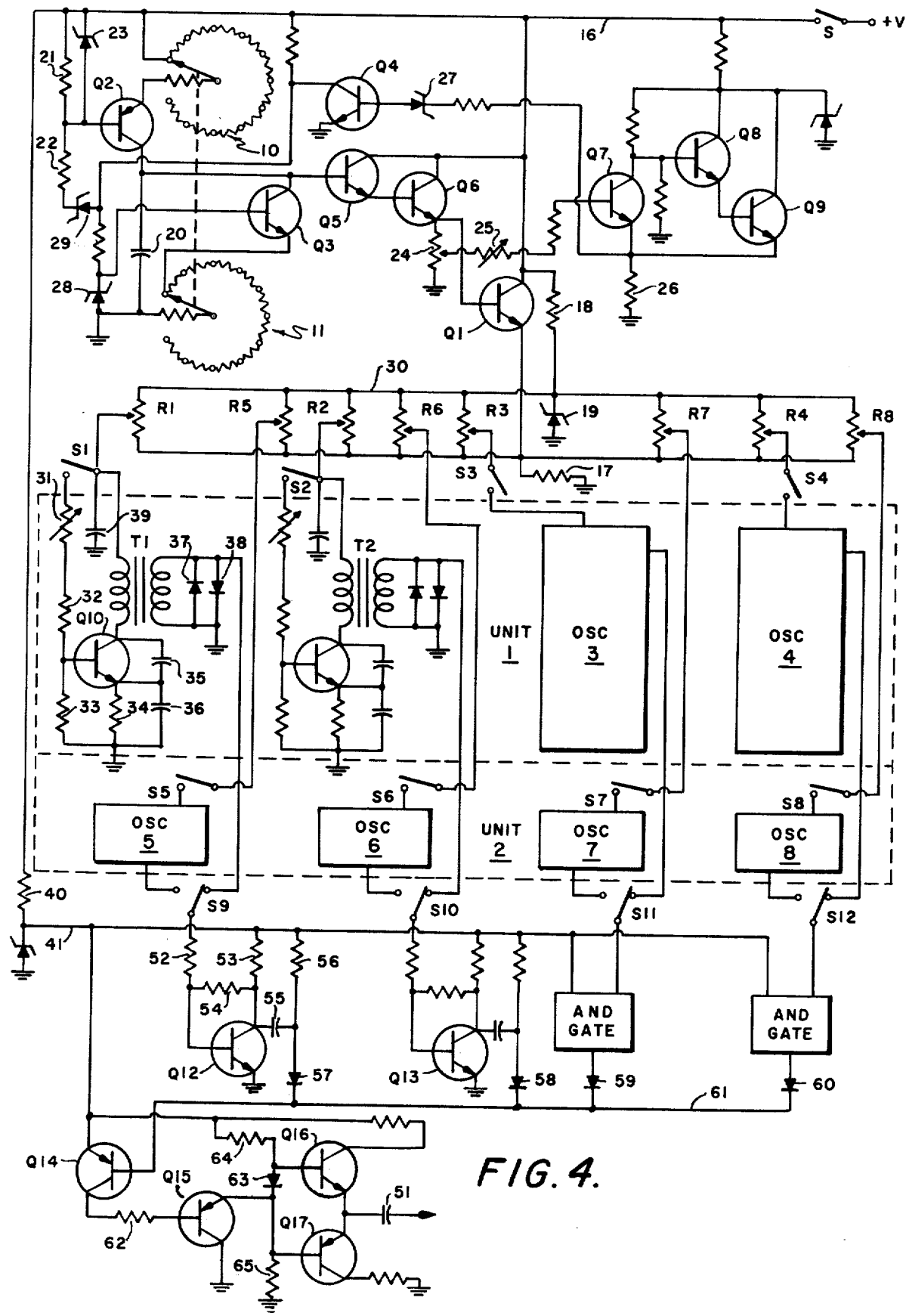
FIG. 4 is a circuit schematic diagram partially in block of the block circuit shown in FIG. 1.

Referring more particularly to FIG. 4 the main switch S is shown through which a positive voltage can be applied to the sweep time control elements 10 and 11 and the several transistors in the circuit of Q1 through Q9. The collector of a voltage and current control transistor Q1 is coupled directly to the positive voltage buss 16 and its emitter is coupled to one side of the potentiometer component 30, this side or buss being coupled to ground through a resistor 17. The upper buss of the potentiometer component 30 is coupled through a resistor 18 to the voltage source conductor is coupled to ground through a Zener diode 19 oriented to present a high resistance until a voltage limit is reached. The main supply conductor 16 is coupled to the first tap on the control element 10 and by way of the movable contact to the emitter of transister Q2, the collector of which is coupled to the upper plate of a storage capacitor 20, the opposite plate of which is grounded. The movable taps of elements 10 and 11 are shown on the first contact which provides the shortest time for the voltage sweep. It may be seen that as the movable taps of 10 and 11 are rotated clockwise, the time element will be lengthened for charging the capacitor 20 through the series coupling of the element 10 and the emitter and collector of transistor Q2. Transistor Q2 has its base biased through the resistors 21 and 22 with a Zener diode 23 in parallel with 21 providing protection for the base of transistor Q2 from excess voltage. The collector of transistor Q2 is coupled to the base of the first transistor Q5 in a complement of transistors Q5 and Q6 in which the collector and emitter of transistor Q6 are in series from the voltage source conductor 16 and the base of the transistor current controller Q1. It may be readily seen that as capacitor 20 charges positively, transistor Q1 will increase in current conduction to raise the voltage on the lower buss of the potentiometer component 30 to increase the voltage level of the several potentiometers R1 through R8 to cause an increase in frequency of the selected oscillators, as will hereinafter be more fully described. This part of the circuit provides the first part of the sweep as shown in FIG. 3 from the low frequency to the high frequency point.

The emitter of transistor Q6 is also coupled across the resistance element of a potentiometer 24 to ground, the adjustable tap of which is coupled through a variable resistance 25 to the base of a transistor Q7 in a trigger circuit consisting of transistors Q7, Q8, and Q9. The output of this trigger circuit is taken from the emitter of transistors Q7 and Q9 across a resistor 26 to ground, this output being coupled through a resistor and a Zener diode 27 to the base of a transistor Q4 having its collector and emitter coupled between the voltage source conductor 16 and ground. This coupling also connects the base of transistor Q3. The base of transistor Q3 is coupled to the cathode of a Zener diode 28 with the anode coupled directly to ground as a voltage protection circuit for transistor Q3. A Zener diode 29 is coupled to the collector of transistor Q4 and to one end of the biasing resistor 22 in the base circuit of transistor Q2 to produce a voltage across the biasing resistors 21 and 22. Transistors Q8 and Q9 are normally conducting to produce a high enough voltage across the resistor 26 to overcome the Zener voltage of the Zener diode 27 to place a positive voltage on the base of transistor Q4 rendering it conductive to reduce the collector voltage to substantially zero thereby applying substantially zero voltage to the base of transistor Q3 holding this transistor normally "off" or non-conductive. As the sweep voltage rises on the emitter of transistor Q6 and across the potentiometer 24 a limit will be reached in accordance with the adjustment of the potentiometer 24 and the variable resistor 25 at which time transistor Q7 will become conductive to cut off transistors Q8 and Q9 to reduce the voltage across resistor 26 by the limiting characteristics of the resistor in the collector circuit of Q7. This will cut off transistor Q4 to supply sufficient positive voltage to the base of transistor Q3 to turn this transistor "on" which will start the discharge of the capacitor 20 through transistor Q3 and the sweep time control element 11 to cause a reduction in the sweep voltage from the high frequency point to the low frequency point, as shown in FIG. 3, on the emitter output of transistor Q6 and therefore on the base of transistor Q1 to produce this downward sweep voltage on the lower buss of the potentiometer component 30. When the transistor Q4 cuts "off" the base voltage of transistor Q2 rises to near the emitter voltage to render Q2 non-conducting and thus stop the charging current to capacitor 20 and, accordingly, the sweep voltage for low-to-high frequency and for high-to-low frequency as shown in FIG. 3 may be accomplished.

The voltage sweep from low to high and high to low in the potentiometer component 30 will be effective on the selected oscillators through the closed selector switches S1 through S8 to cause these oscillators to sweep a frequency in its partial band. For example, if switch S1 were closed, the sweep voltage from the component 30 will be applied through the variable resistor 31 and the fixed resistor 32 to the base of a transistor Q10, this base being biased from ground through the resistor 33. This voltage is also applied from switch S1 through the primary winding of a transformer T1 to the collector of transistor Q10 for collector supply voltage, the emitter of transistor Q10 being coupled through an emitter load resistor 34 to ground. The collector and emitter junction of transistor Q10 is paralleled by a capacitor 35 while the resistor 34 is paralleled by capacitor 36. One lead of the secondary winding of transformer T1 is coupled to ground while the other lead of the secondary winding provides the output of this collector to the selector switch contact S9. The secondary winding of transformer T1 has two oppositely poled diodes 37 and 38 coupled in parallel to limit the positive and negative voltage swings of the oscillators. These oscillators may be of the conventional type and are preferably of the type to produce square waves on the output of the secondary. Although only oscillators #1 and #2 are shown in circuit schematic, it is to be understood that all the oscillators are of similar construction, their differences being in the values of the resistors 31,32,33 and capacitor 39 to establish the frequency bandwidth of that particular oscillator. This frequency band can be trimmed by the trimmer variable resistance 31 to provide a contiguous frequency band throughout the several oscillators selected. As may be seen in FIG. 4 the outputs of oscillators #1 and #5 may be selected by the selector switch S9, the outputs of the oscillators of #2 and #6 may be selected by S10, the outputs of oscillators #3 and #7 may be selected by S11, and the outputs of oscillators #4 and #8 selected by S12. The switch blade of each selector switch S9 is coupled to an AND circuit consisting of AND gates, two of which are shown in circuit schematic and two of which are shown in block.

Each AND gate has a transistor, such as Q12 in the first AND gate and Q13 in the second coupled to the main voltage source conductor 16 through a resistor 40 to provide a voltage supply on the conductor means 41. The base of transistor Q12 is coupled through a resistor 52 to the switch blade of S9 while the collector of this transistor is coupled to the voltage supply 41 through a resistor 53. The collector and base of this transistor are coupled through a resistor 54 to place transistor Q12 in a conductive state normally. The output of this AND gate is to one plate of a coupling capacitor 55, the opposite plate of which is coupled to the conductor 41 through a resistor 56 and through a diode 57 to the base of a transistor Q14. Since all of the AND gates are similar to the one just described, no further description will be given for the remaining AND gates except that the output of each AND gate is through a diode such as diode 57 for the first AND gate, diode 58 for the second, diode 59 for the third, and diode 60 for the fourth AND gate. The cathodes of all these diodes 57 through 60 are coupled to a common conductor 61 coupled to the base of transistor Q14 on which conductor the frequency outputs are mixed in a complex wave. The transistor Q14 is normally "off" since its emitter is coupled directly to the voltage source conductor 41 and its collector is coupled to the base of a transistor Q15 through a coupling resistor 62. Transistor Q15 is normally "off" having its collector grounded and its emitter coupled to the voltage source 41 through a diode 63 and a resistor 64, this emitter being coupled through a load resistor 65 to ground. The terminal of the resistor 64 and diode 63 is coupled to the base of a transistor Q16 coupled in series with a transistor Q17 with the collector of Q16 coupled to the voltage source conductor 41 and the collector of transistor Q17 coupled through a load resistor to ground. The emitter of Q15 is connected directly to the base of Q17. The transistor Q16 is an NPN while the transistor Q17 is a PNP with their emitters coupled in common, this common coupling being the output through the output capacitor 51.

Whenever the oscillator waves of the selected oscillators through the switches S9 through S12 go above or below the average value producing near zero voltages on the bases of transistors Q12 and Q13 and similar transistors in the additional AND gates, these transistors will be cut off producing a positive voltage pulse through the output diodes 57 through 60, turning "on" transistors Q14 and Q15 to cause transistor Q16 to be nonconductive and transistor Q17 conductive thereby producing a negative voltage pulse on the output 51 of the AND circuit. Transistor Q16 is normally "on" and transistor Q17 is normally "off" but when transistor Q15 is turned "on" this lowers the base voltage on transistor Q16 to cut this transistor "off" since the base and emitter voltages approach, and transistors Q17 will be turned "on" since the base voltage increases over the emitter voltage thereby causing a quick reduction of the positive voltage on one plate of the output coupling capacitor 51 rapidly reducing it toward ground through the transistor Q17. Thus, whenever the complex voltage wave of the selected oscillators goes above or below its average value, a negative voltage pulse will be applied on the output through the coupling capacitor 51 which may be utilized in the control circuit in the countermeasures repeater radar to transmit the deception radar signals to the enemy radar.

OPERATION

In the operation of the device let it be assumed that an enemy silent sequential lobing radar is detected as being operative in the area and it is desirable to countermeasure with a repeater radar. Since the enemy radar may be using any lobing frequency within a fairly wide band, this entire band of frequencies must be swept by countermeasure equipment. Since a single linear sweep cannot cover such a wide band in the short time necessary, such as 30 seconds, two to four oscillators are used to cover partial bands of the total band simultaneously to operate the countermeasures repeater radar in time. As shown in FIG. 1 let it be assumed that switches S1 through S4 are closed to make unit 1 of the oscillator operative. Oscillator #1 may cover a frequency partial band of 84.5 to 98 cycles, oscillator #2 may cover the partial band from 98 to 113 cycles, oscillator #3 may cover a partial band of 113 to 129 cycles, and oscillator #4 may cover a frequency partial band of 129 to 147 cycles thereby covering the frequency band of 84.5 to 147 cycles expected from the enemy radar. As these frequencies are generated there will be periods in which a complex wave will be produced from the mixture and when this complex wave goes negative it will be conducted through the AND circuit 50 to the output 51 for use in tripping the countermeasures repeater radar to produce deceptive output pulses back to the enemy radar. The time for making this sweep of the total frequency range may be made as low as two seconds, as illustrated in FIG. 3, to a selection of 4 through 22 seconds by rotating the knob 12 to positions 2 through 11 on the dial of the face plate of unit 1, as shown in FIG. 2. A control of the sweep time is a choice to be made by the operator in meeting the demands of the circumstances of the enemy radar. The various oscillators or oscillator units can be chosen by the selection of the frequency switches S1 through S4 in unit 1 and S5 through S8 in unit 2. In this manner a broad band of frequencies can be scanned in the time that it takes to sweep any partial band by any single oscillator and thus detect the frequency of the enemy radar in sufficient time to countermeasure with deceptive signals.

While many modifications can be made in the preferred embodiment shown and described herein, I desire to be limited in the scope of my invention only by the scope of the appended claims.

I claim:

1. A control circuit for a repeater radar in a passive lobing countermeasure radar system comprising:
   a plurality of oscillators coupled to a single voltage source through selective power switches to produce a plurality of frequency band portions on outputs thereof;
   a timing circuit having a variable current flow device in the voltage source coupling of said oscillators between said voltage source and said power switches to vary the voltage from minimum to maximum and return thereby varying the time it takes each oscillator to sweep its frequency portion; and
   an AND circuit coupled to the outputs of all selected oscillators to mix the output frequency band portions into a complex wave and to pass an output signal when said complex wave drops below the average values of oscillator outputs whereby said output signal is usable to activate a repeater countermeasure radar.

2. A control circuit for a repeater radar in a passive lobing countermeasures radar system as set forth in claim 1 wherein
   said timing circuit includes a pair of ganged variable impedances, one of which controls the variable current flow device for the time it takes to advance the voltage to the oscillators from the minimum voltage to the maximum voltage, and the other of which controls the variable current flow device for the time it takes to retard the voltage from the maximum voltage to the minimum voltage.

3. A control circuit for a repeater radar in a passive lobing countermeasures radar system as set forth in claim 2 wherein
   said AND circuit includes a transistor inverter AND gate for each oscillator output coupled through a diode to an output transistor network to produce a negative voltage signal as said output signal when said complex wave becomes negative to prevent in-phase components with respect to enemy radar range signals.

4. A control circuit for a repeater radar in a passive lobing countermeasures radar system as set forth in claim 3 wherein
   said oscillators each has a transistor with the emitter and collector circuit thereof in series with the primary winding of an output transformer, the secondary of said output transformer having reversely oriented diodes thereacross to limit bipolar voltage amplitudes of said oscillations.

5. A control circuit for a repeater radar in a passive lobing countermeasures radar system as set forth in claim 4 wherein
   said voltage source coupling of said oscillators includes a high and low voltage buss with potentiometers coupled thereacross, the adjustable tap of each potentiometer being coupled to one each oscillator to adjust the center frequency thereof.

6. A control circuit for a repeater radar in a passive lobing countermeasures radar system as set forth in claim 5 wherein
   said variable current flow device of said timing circuit is a variable current flow transistor having the collector and emitter thereof coupled in series between said voltage source and one of said voltage busses, said voltage source being coupled to the other of said voltage busses and said other of said voltage busses being coupled to a zero potential through a Zener diode oriented to provide high resistance from said buss to said zero potential.

7. A control circuit for a repeater radar in a passive lobing countermeasures radar system as set forth in claim 6 wherein
   said one of said ganged variable impedances has the variable output thereof coupled through a transistor in common to one plate of a storage capacitor and to the base of said variable current flow transistor across the resistance of a potentiometer, the adjustable tap of said potentiometer being coupled to a trigger circuit, and the other of said ganged variable impedances being coupled through a switching transistor to said trigger circuit to control discharge of said storage capacitor to control said variable current flow transistor to produce a timed rising and falling voltage across said high and low voltage busses.

8. A control circuit for a repeater radar in a passive lobing countermeasures radar system as set forth in claim 7 wherein
   said plurality of oscillators include two units of four oscillators each, the outputs of which have selector switches therein to select the output to said AND circuit.

* * * * *